US010989824B2

(12) United States Patent
Hornby et al.

(10) Patent No.: US 10,989,824 B2
(45) Date of Patent: Apr. 27, 2021

(54) DEPTH-DEPENDENT MUD DENSITY DETERMINATION AND PROCESSING FOR HORIZONTAL SHEAR SLOWNESS IN VERTICAL TRANSVERSE ISOTROPY ENVIRONMENT USING FULL-WAVEFORM SONIC DATA

(71) Applicant: Halliburton Energy Services, Inc., Houston, TX (US)

(72) Inventors: Brian Edward Hornby, Houston, TX (US); Mark Vincent Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 16/440,634

(22) Filed: Jun. 13, 2019

(65) Prior Publication Data

US 2020/0393587 A1    Dec. 17, 2020

(51) Int. Cl.
*G01V 1/30* (2006.01)

(52) U.S. Cl.
CPC .......... *G01V 1/306* (2013.01); *G01V 2210/47* (2013.01); *G01V 2210/6224* (2013.01)

(58) Field of Classification Search
CPC ............... G01V 1/306; G01V 2210/47; G01V 2210/6224
See application file for complete search history.

(56) References Cited

U.S. PATENT DOCUMENTS

| 6,625,541 B1 * | 9/2003 | Shenoy | G01V 1/288 |
| | | | 702/6 |
| 6,920,082 B2 * | 7/2005 | Tang | G01V 1/50 |
| | | | 367/31 |
| 2004/0095847 A1 | 5/2004 | Hassan et al. | |

(Continued)

FOREIGN PATENT DOCUMENTS

WO    2018-084847    5/2018

OTHER PUBLICATIONS

International Search Report and Written Opinion for Application No. PCT/US2019/037118, dated Mar. 5, 2020.

(Continued)

*Primary Examiner* — Amine Benlagsir
(74) *Attorney, Agent, or Firm* — John Wustenberg; C. Tumey Law Group PLLC

(57) ABSTRACT

An acoustic logging method that may comprise acquiring waveforms for multiple acoustic wave modes as a function of tool position in a borehole; deriving position-dependent mode dispersion curves from the waveforms; accessing a computed library of dispersion curves for a vertical shear slowness (s) and a Thomsen gamma ($\gamma$) of a given acoustic wave mode as a function of frequency; interpolating dispersion curves in the computed library to an assumed known compressional wave slowness, a borehole radius, a formation density, a mud density, and a mud slowness; computing an adaptive weight; and inverting dispersion curve modes jointly for a shear wave anisotropy, a vertical shear wave slowness, an inverted mud slowness, and an inverted mud (Continued)

density as a function of depth. An acoustic logging system may comprise a logging tool, a conveyance attached to the logging tool, at least one sensor, and at least one processor.

20 Claims, 12 Drawing Sheets

(56) References Cited

U.S. PATENT DOCUMENTS

| | | | |
|---|---|---|---|
| 2005/0261835 A1 | 11/2005 | Wang | |
| 2006/0120217 A1 | 6/2006 | Wu et al. | |
| 2008/0319675 A1* | 12/2008 | Sayers | G01V 1/50 702/11 |
| 2009/0185446 A1 | 7/2009 | Zheng et al. | |
| 2011/0134720 A1* | 6/2011 | Bratton | G01V 1/44 367/35 |
| 2011/0172921 A1* | 7/2011 | Valero | E21B 47/00 702/7 |
| 2014/0086009 A1* | 3/2014 | Yoneshima | G01V 1/48 367/31 |
| 2015/0049585 A1* | 2/2015 | Collins | G01V 1/50 367/35 |
| 2015/0137987 A1* | 5/2015 | Donderici | E21B 47/12 340/856.4 |
| 2016/0291181 A1* | 10/2016 | Sinha | G01V 1/50 |
| 2017/0115413 A1* | 4/2017 | Wang | G01V 1/303 |
| 2017/0371072 A1* | 12/2017 | Shetty | G01V 99/005 |
| 2018/0164463 A1* | 6/2018 | Hornby | E21B 49/00 |
| 2019/0129053 A1* | 5/2019 | Wang | G01V 1/284 |

OTHER PUBLICATIONS

Halliburton, Vertical Transverse Isotropy (VTI) Anisotropy Analysis, Formation Evaluation—Petrophysics, H012807, Jan. 2018.

Ruijia Wang, et al., Full-Frequency Inversion for Simultaneous Estimation of VTI anisotropy, Formation Shear Slowness, and Drilling Fluid Slowness Using Borehole Sonic Data, SEG, 2017.

* cited by examiner

DEPTH-DEPENDENT MUD DENSITY DETERMINATION AND PROCESSING FOR HORIZONTAL SHEAR SLOWNESS IN VERTICAL TRANSVERSE ISOTROPY ENVIRONMENT USING FULL-WAVEFORM SONIC DATA

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. Resistivity, density, and porosity logs have proven to be particularly useful for determining the location of hydrocarbon gases and fluids. One technique for collecting relevant information may be acoustic logging. Acoustic logging tools provide measurements of acoustic wave propagation speeds through the formation. There are multiple wave propagation modes that can be measured, including compressional and flexural. Taken together, the propagation speeds of these various modes often indicate formation density and porosity.

Acoustic logging measurements are also valuable for determining the velocity structure of subsurface formations, which information is useful for migrating seismic survey data to obtain accurate images of the subsurface formation structure. Subsurface formations are often anisotropic, meaning that the acoustic wave's propagation speed depends on the direction in which the wave propagates. Most often the formations, even when anisotropic, are relatively isotropic in the horizontal plane. This particular version of anisotropy is often called vertical transverse isotropy (VTI). Accurate imaging requires that such anisotropy be accounted for during the migration process. When sufficiently precise, such imaging enables reservoirs to be delineated from surrounding formations, and further indicates the presence of formation boundaries, laminations, and fractures, which information is desired by an operator as they formulate a production strategy that maximizes the reservoir's economic value. However, inversion of these measurements for VTI anisotropy is sensitive to mud slowness and mud density in a wellbore. Even a small error in these wellbore parameters may result in large anisotropy estimation errors.

BRIEF DESCRIPTION OF THE DRAWINGS

These drawings illustrate certain aspects of some of the embodiments of the present disclosure, and should not be used to limit or define the disclosure.

DETAILED DESCRIPTION

Accurate anisotropy measurements may improve seismic-well measurements. Determination of mud density as a function of depth may also provide information to an operator and may improve the accuracy of any algorithm that may use borehole fluid density as an input. Proper measurements may be taken with logging devices which may be found in a conveyance and/or bottom hole assembly.

Figure 1:
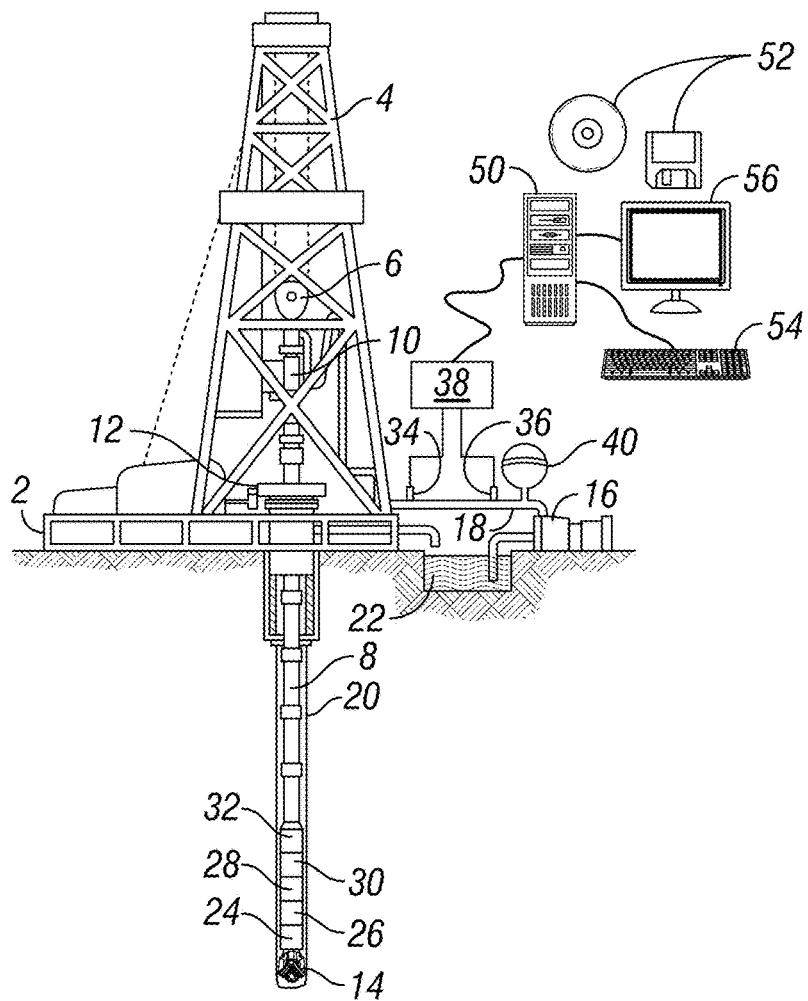
FIG. 1 shows an illustrative logging-while-drilling (LWD) environment.

Accordingly, FIG. 1 shows an illustrative logging while drilling (LWD) environment. A drilling platform 2 is equipped with a derrick 4 that supports a hoist 6. The rig operator drills an oil or gas well using a drill string 8 of multiple concentric drill pipes. The hoist 6 suspends a top drive 10 that rotates the drill string 8 as it lowers the drill string through the wellhead 12. Connected to the lower end of the drill string 8 is a drill bit 14. The drill bit 14 is rotated and drilling accomplished by rotating the drill string 8, by use of a downhole motor near the drill bit, or by both methods. Recirculation equipment 16 pumps drilling fluid through supply pipe 18, through top drive 10, and down through the drill string 8 at high pressures and volumes to emerge through nozzles or jets in the drill bit 14. The drilling fluid then travels back up the hole via the annulus formed between the exterior of the drill string 8 and the borehole wall 20, through a blowout preventer, and into a retention pit 22 on the surface. On the surface, the drilling fluid is cleaned and then recirculated by recirculation equipment 16. The drilling fluid carries cuttings from the base of the bore to the surface and balances the hydrostatic pressure in the rock formations.

The bottomhole assembly (i.e., the lowermost part of drill string 8) includes thick-walled tubulars called drill collars, which add weight and rigidity to aid the drilling process. The thick walls of these drill collars make them useful for housing instrumentation and LWD sensors. Thus, for example, the bottomhole assembly of FIG. 1 includes a natural gamma ray detector 24, a resistivity tool 28, an acoustic logging tool 26, a neutron porosity tool 30, and a control & telemetry module 32. Other tools and sensors can also be included in the bottomhole assembly, including position sensors, orientation sensors, pressure sensors, temperature sensors, vibration sensors, etc. From the various bottomhole assembly sensors, the control and telemetry module 32 collects data regarding the formation properties and/or various drilling parameters and stores the data in internal memory. In addition, some or all of the data is transmitted to the surface by, e.g., mud pulse telemetry.

Telemetry module 32 modulates a resistance to drilling fluid flow to generate pressure pulses that propagate to the surface. One or more pressure transducers 34, 36 (isolated from the noise of the recirculation equipment 16 by a desurger 40) convert the pressure signal into electrical signal(s) for a signal digitizer 38. The signal digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain and view an acoustic slowness and anisotropy log.

Figure 2:
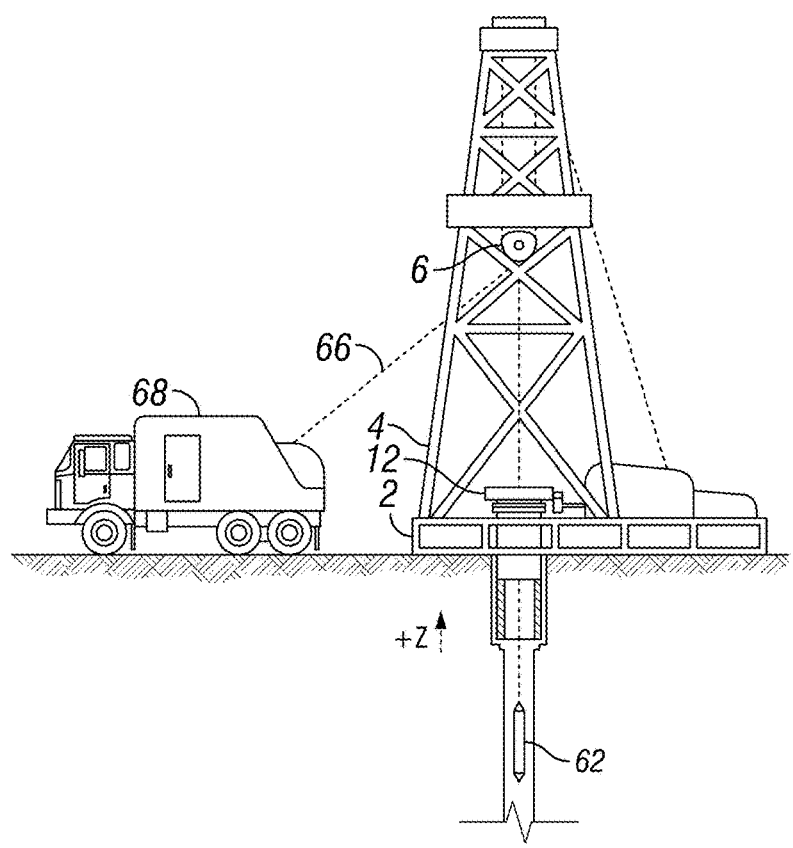
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 62, i.e., a sensing instrument sonde suspended by a cable 66 having conductors for transporting power to the tool and telemetry from the tool to the surface. The wireline tool assembly can include an acoustic logging tool similar to the LWD embodiment described herein below. Other formation property sensors may additionally or alternatively be included to measure formation properties as the tool is pulled uphole. A logging facility 68 collects measurements from the wireline logging tool 62 and includes computing facilities for processing and storing the measurements gathered by the logging tool.

Figure 3A:
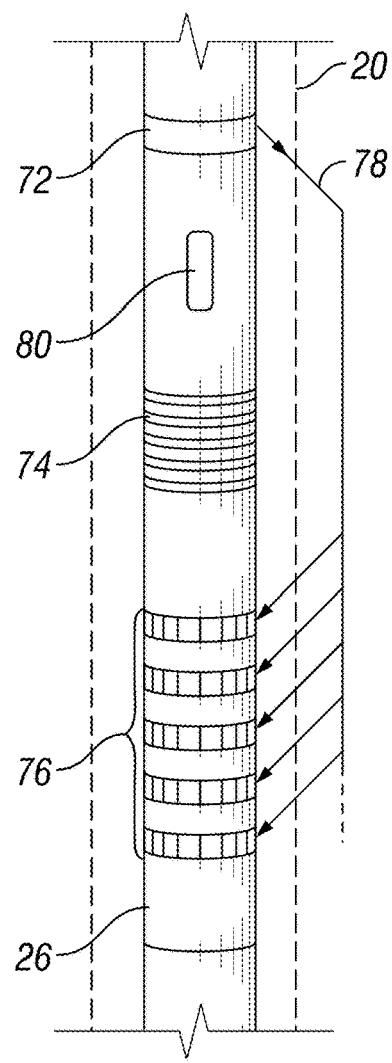
FIG. 3A shows an illustrative acoustic logging tool.

FIG. 3A shows an illustrative embodiment of an acoustic logging tool 26 disposed proximate a borehole wall 20. The acoustic logging tool 26 includes a monopole acoustic source 72, an acoustic isolator 74, a receiver array 76, and a multi-pole source 80. The multi-pole source 80 may be a dipole, crossed-dipole, quadrupole, hexapole, or higher-order multi-pole transmitter. Some tool embodiments may include one acoustic source that is configurable to generate different wave modes rather than having separate transmitter sources, but in each case the source(s) are designed to generate acoustic waves 78 that propagate through the formation and are detected by the receiver array 76. The acoustic source (e.g., the monopole acoustic source 72, multi-pole source 80, or both) may be made up of piezoelectric elements, bender bars, or other transducers suitable for generating acoustic waves in downhole conditions. The contemplated operating frequencies for the acoustic logging tool 26 are in the range between 0.5 kHz and 30 kHz, inclusive. The operating frequency may be selected based on a tradeoff between attenuation and wavelength in which the wavelength is minimized subject to requirements for limited attenuation. Subject to the attenuation limits on performance, smaller wavelengths may offer improved spatial resolution of the tool.

Figure 3B:
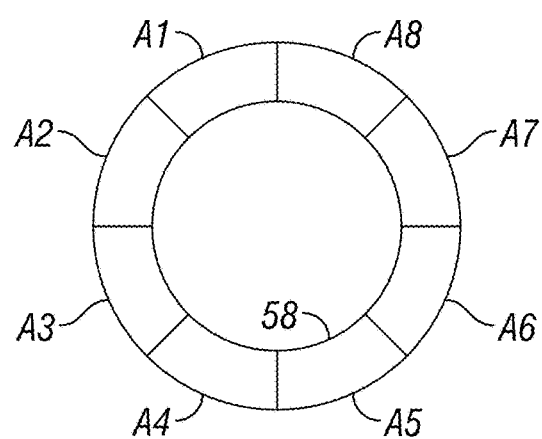
FIG. 3B shows an illustrative receiver having azimuthal sensitivity.

The acoustic isolator 74 serves to attenuate and delay acoustic waves that propagate through the body of the tool from the monopole acoustic source 72 to the receiver array 76. Any standard acoustic isolator may be used. Receiver array 76 may include multiple sectorized receivers spaced apart along the axis of the tool. (One such sectorized receiver 58 is illustrated in cross-section in FIG. 3B). Although five receivers are shown in FIG. 3A, the number may vary from one to sixteen or more. Each sectorized receiver 58 includes a number of azimuthally spaced sectors. Referring to FIG. 3B, a sectorized receiver 58 having eight sectors A1-A8 is shown. However, the number of sectors may vary and is preferably (but not necessarily) in the range between 4 and 16, inclusive. Each sector may include a piezoelectric element that converts acoustic waves into an electrical signal that is amplified and converted to a digital signal. The digital signal from each sector is individually measured by an internal controller for processing, storage, and/or transmission to an uphole computing facility. Though the individual sectors may be calibrated to match their responses, such calibrations may vary differently for each sector as a function of temperature, pressure, and other environmental factors. Accordingly, in at least some embodiments, the individual sectors may be machined from a cylindrical (or conical) transducer. In this fashion, it may ensure that each of the receiver sectors may have matching characteristics.

When the acoustic logging tool 26 is enabled, the internal controller controls the triggering and timing of the monopole acoustic source 72 and/or multi-pole source 80, and records and processes the signals from the receiver array 76. The internal controller fires the monopole acoustic source 72 periodically, producing acoustic pressure waves that propagate through the fluid in borehole wall 20 and into the surrounding formation. As these pressure waves propagate past the receiver array 76, they cause pressure variations that can be detected by the receiver array elements.

The receiver array signals may be processed by the internal controller to determine the true formation anisotropy and shear velocity, or the signals may be communicated to the uphole computer system for processing. The measurements are associated with borehole position (and possibly tool orientation) to generate a log or image of the acoustical properties of the borehole. The log or image may be stored and ultimately displayed for viewing by an operator.

Figure 4:
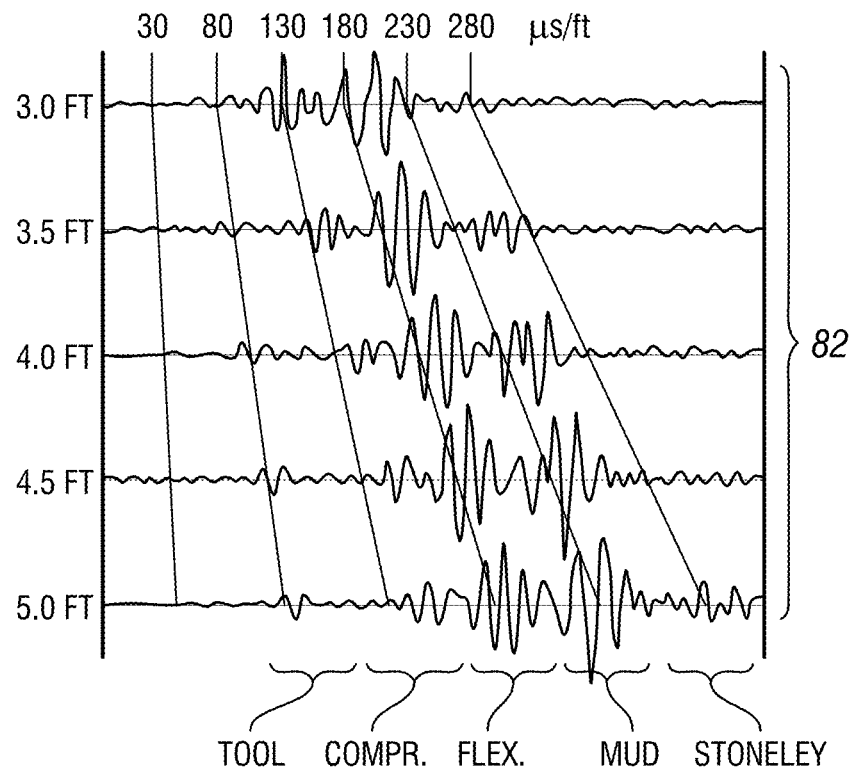
FIG. 4 shows illustrative receive waveforms.

FIG. 4 shows a set of illustrative amplitude versus time waveforms 82 detected by the receiver array 76 in response to one triggering of the monopole acoustic source 72 and/or multi-pole source 80. The receivers may be located at about 3 ft. (about 1 meter), about 3.5 ft. (about 1 meter), about 4 ft. (about 1.25 meter), about 4.5 ft. (about 1.25 meters) and about 5 ft. (1.5 meters) from the monopole acoustic source 72, and various slowness value slopes are shown to aid interpretation. The time scale is from about 80 µs to about 1500 µs. Each of the waveforms is shown for a corresponding receiver as a function of time since the transmitter firing. (Note the increased time delay before the acoustic waves reach the increasingly distant receivers.) After recording the waveforms, the internal controller typically normalizes the waveforms so that they have the same signal energy.

The detected waveforms represent multiple waves, including waves propagating through the body of the tool ("tool waves"), compression waves from the formation, shear waves from the formation, waves propagating through the borehole fluid ("mud waves"), and Stoneley waves propagating along the borehole wall. Each wave type has a different propagation velocity which separates them from each other and enables their velocities to be independently measured.

The receiver array signals may be processed by a downhole controller to determine $V_S$ (the formation shear wave velocity) and $V_C$ (the formation compression wave velocity), or the signals may be communicated to the uphole computer system for processing. (Though the term "velocity" is commonly used, the measured value is normally a scalar value, i.e., the speed. The speed (velocity) may also be equivalently expressed in terms of slowness, which is the reciprocal of speed.) When the velocity is determined as a function of frequency, the velocity may be termed a "dispersion curve", as the variation of velocity with frequency causes the wave energy to spread out as it propagates.

The acoustic velocity measurements are associated with borehole position (and possibly tool orientation) to generate a log or image of the acoustical properties of the borehole. The log or image is stored and ultimately displayed for viewing by a user.

The illustrative acoustic logging tool 26 may further include a fluid cell to measure acoustic properties of the borehole fluid. Specifically, the fluid cell measures $V_M$, the velocity of compression waves in the borehole fluid and $\rho_M$, the density of the borehole fluid. Alternatively, the acoustic impedance $Z_M = \rho_M V_M$ may be measured. The fluid cell can be operated in a manner that avoids interference from firings of the monopole acoustic source 72, e.g., the borehole fluid property measurements may be made while the monopole acoustic source 72 is quiet, and the formation wave velocity measurements may be made while the fluid cell is quiet. Alternatively, the acoustic properties of the borehole fluid may be measured at the surface and subjected to corrections for compensate for temperature and pressure variation.

Figure 5:
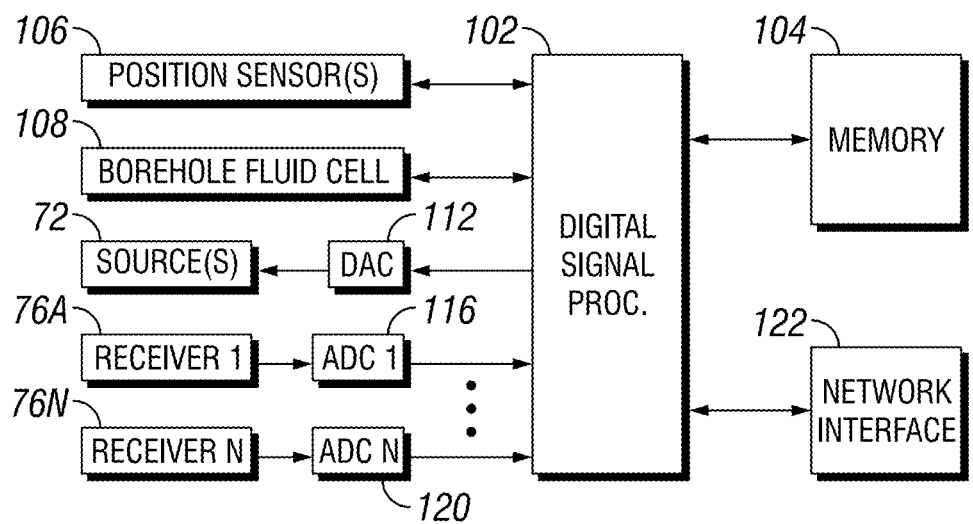
FIG. 5 is a functional block diagram of illustrative tool electronics.

FIG. 5 is a functional block diagram of the illustrative acoustic logging tool 26. A digital signal processor 102 operates as an internal controller for acoustic logging tool 26 by executing software stored in memory 104. The software configures the digital signal processor 102 to collect measurements from various measurement modules such as position sensor 106 and fluid cell 108. (Note that these modules can alternatively be implemented as separate tools in a wireline sonde or bottomhole assembly, in which case such measurements would be gathered by a control/telemetry module.)

The software further configures the digital signal processor 102 to fire the monopole acoustic source(s) 72 via a digital to analog converter 112, and further configures the digital signal processor 102 to obtain receive waveforms from receiver array 76 via analog to digital converters 116-120. The digitized waveforms may be stored in memory 104 and/or processed to determine compression and shear wave velocities. As explained further below, the processor may process the dispersion curve measurements to derive at least formation shear velocity and acoustic anisotropy. Alternatively, these measurements may be communicated to a control module or a surface processing facility to be combined there. In either case, the derived acoustic properties are associated with the position of the logging tool to provide a formation property log. A network interface 122 connects the acoustic logging tool to a control/telemetry module via a tool bus, thereby enabling the digital signal processor 102 to communicate information to the surface and to receive commands from the surface (e.g., activating the tool or changing its operating parameters).

Figure 6:
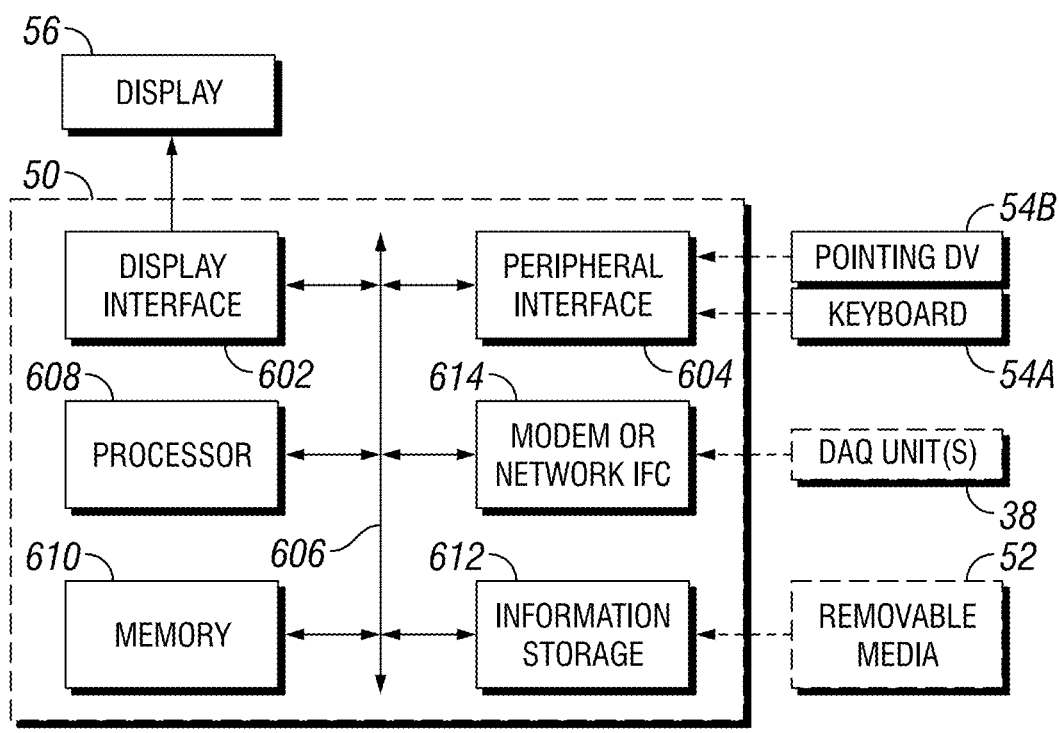
FIG. 6 shows an illustrative system for implementing methods disclosed herein.

FIG. 6 is a block diagram of an illustrative surface processing system suitable for collecting, processing, and displaying logging data. In some embodiments, a user may further interact with the system to send command to the bottom hole assembly to adjust its operation in response to the received data. The system of FIG. 6 may take the form of a computer that includes a computer 50, a computer monitor 56, and one or more input devices 54A, 54B. Located in the computer 50 may be a display interface 602, a peripheral interface 604, a bus 606, a processor 608, a memory 610, an information storage device 612, and a network interface 614. Bus 606 interconnects the various elements of the computer and transports their communications.

In examples, the surface telemetry transducers may be coupled to the processing system via a signal digitizer 38 and the network interface 614 to enable the system to communicate with the bottom hole assembly. In accordance with user input received via peripheral interface 604 and program instructions from memory 610 and/or information storage device 612, the processor processes the received telemetry information received via network interface 614 to construct formation property logs and display them to the user.

The processor 608, and hence the system as a whole, generally operates in accordance with one or more programs stored on an information storage medium (e.g., in information storage device 612 or information storage media 52 that may be removable). Similarly, the bottom hole assembly control module and/or processor 102 operates in accordance with one or more programs stored in an internal memory. One or more of these programs configures the tool controller, the bottomhole assembly control module, and the surface processing system to individually or collectively carry out at least one of the acoustic logging methods disclosed herein.

In examples, formation properties may utilize three parameters to characterize transversely isotropic materials. In terms of the components of the elastic stiffness matrix, at least one of the three parameters was defined as:

$$\gamma = \frac{c_{66} - c_{44}}{2C_{44}} \tag{1}$$

where, as an aside, we note that the stiffness constant $C_{44}$ equals the shear modulus for a vertically-traveling horizontally polarized shear wave, and stiffness constant $C_{66}$ equals the shear modulus for a horizontally-traveling horizontally polarized shear wave. At times hereafter, this parameter may be referred to as the shear wave anisotropy, or Thomsen gamma. A perfectly isotropic formation would have $\gamma=0$, while many shale formations often have shear wave anisotropies on the order of 20-30%. VTI information plays an important role in seismic imaging of reservoirs, thus it is desirable to obtain VTI information as a function of depth from acoustic logging tools. Such measurements can be influenced by a variety of factors including mud speed, borehole rugosity, contact between the tool and the wall ("road noise"), formation inhomogeneity, mode contamination from off-centering, and drilling noise.

In addition to VTI information, mud slowness may be a parameter that may be useful to invert waveform sonic data for elastic anisotropy. In examples, mud slowness may be utilized in an inversion for the VTI anisotropy parameter, Thomsen Gamma and $C_{44}$, from Stoneley and flexural dispersion curves given a known mud slowness. In examples, the inversion may be sensitive to mud slowness, where an error of 1% to 5% in µs/ft. in the assumed mud slowness may result in the Thomsen Gamma inversion parameter being off by a factor of two.

Figure 7:
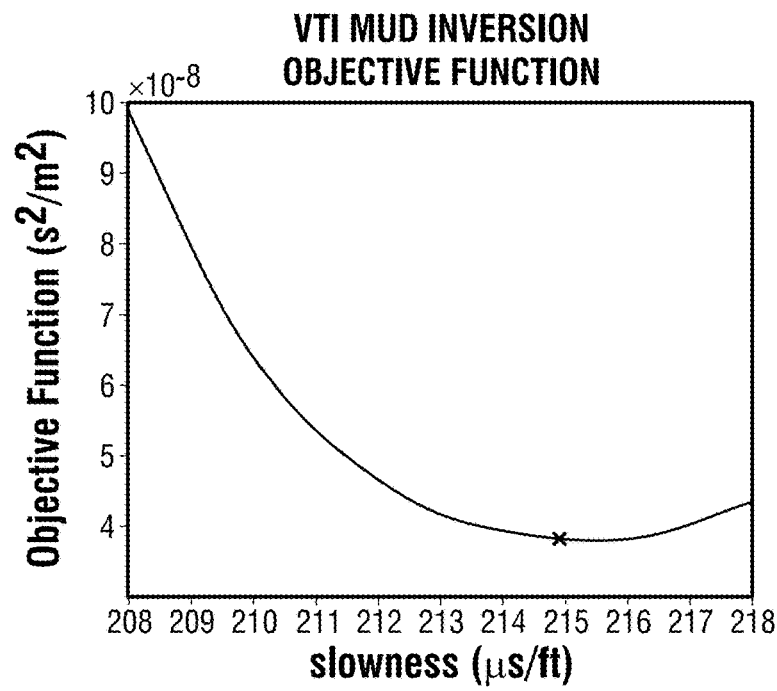
FIG. 7 is a graph illustrating the identification of mud slowness.
Figure 8:
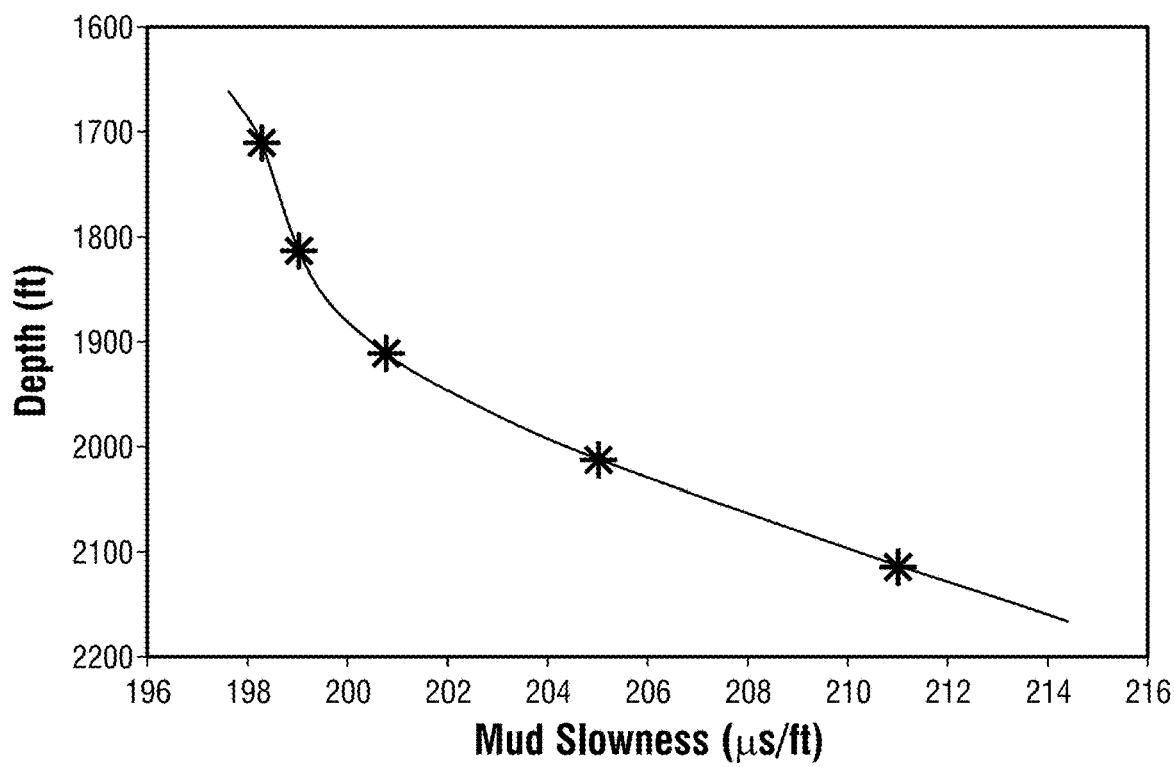
FIG. 8 is a graph illustrating mud slowness in view of depth.

During measurement operation of a wellbore, processing of a wellbore may involve zoning in about 50 ft. to about 100 ft. (about 15 meters to about 30 meters) sections, inverting for a global (i.e. depth independent in a section) mud slowness in each section, fitting the zone-to-zone mud slowness to a smoothly varying continuous mud slowness curve, and doing a final depth-to-depth Thomsen Gamma inversion over the entire well using the mud slowness curve. In various parts of the document, the terms zone, section, and depth interval are used interchangeably. FIGS. 7 and 8 show the result of this procedure for mud slowness throughout a wellbore of interest. FIG. 7 shows the 'global' objective function for a depth interval as a function of mud slowness. The inversion for mud slowness in a zone (depth interval) is done by minimizing the 'global' objective function. Thus, the estimated mud slowness for the depth interval of FIG. 7 would be approximately 215 μs/ft. as defined by the minimum of the objective function. The global objective function for a depth interval will be described in more detail later.

FIG. 8 shows the fitting of a smoothly varying mud slowness curve to the mud-slowness estimates from all the zones. Note in this example the data points are separated by approximately 100 ft., which would be the depth interval for each zone. However, smaller zones may be necessary if the mud slowness changes more rapidly. This can happen, for example, when a mud pill is placed in the well.

It should be noted that mud density ($\rho m$) may be a parameter used in the inversion above. In examples, mud density may be a constant value measured by an operator from a sample taken from a mud-pit during drilling operations. As illustrated in FIG. 8, mud slowness changes throughout the wellbore, and it is known that small changes in mud slowness may cause large changes in output anisotropy parameter (Thomsen Gamma inversion). Thus, any error in a mud slowness inversion due to error in assumed mud density taken by the operator may impact results.

Figure 9:
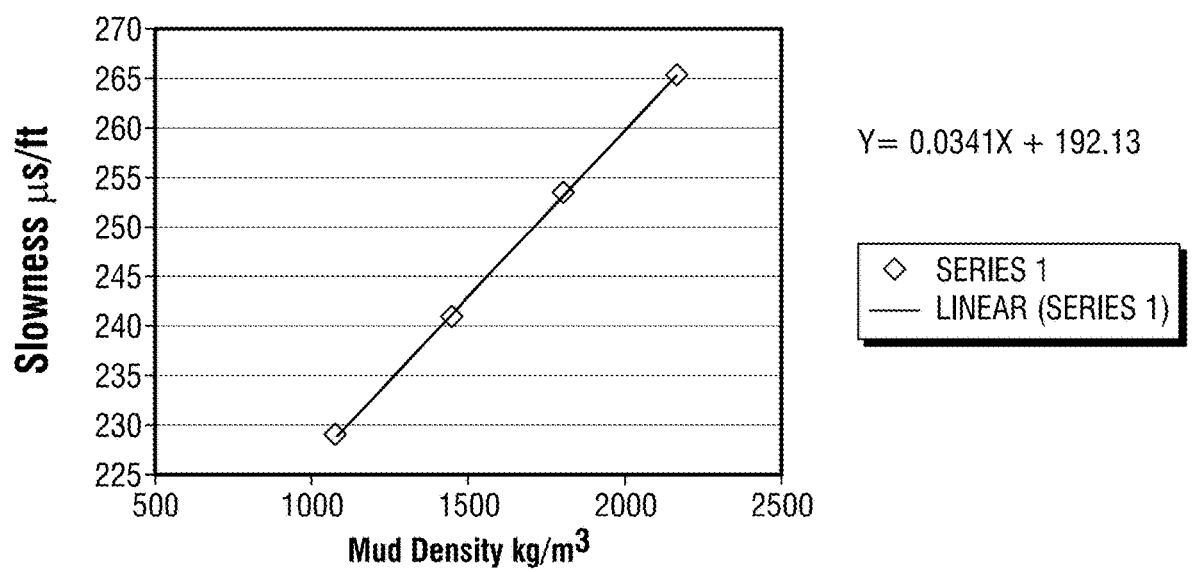
FIG. 9 is a graph of measurements from a drilling fluid sample.
Figure 10B:
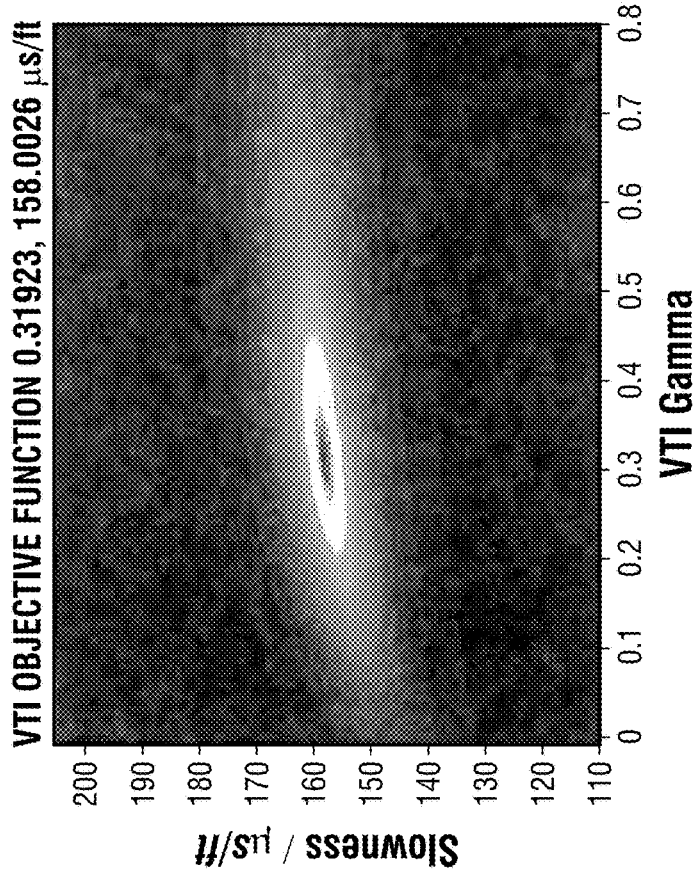
FIGS. 10A and 10B are graphs illustrating an inverted Gamma anisotropy parameter with surface mud density measurements.
Figure 10A:
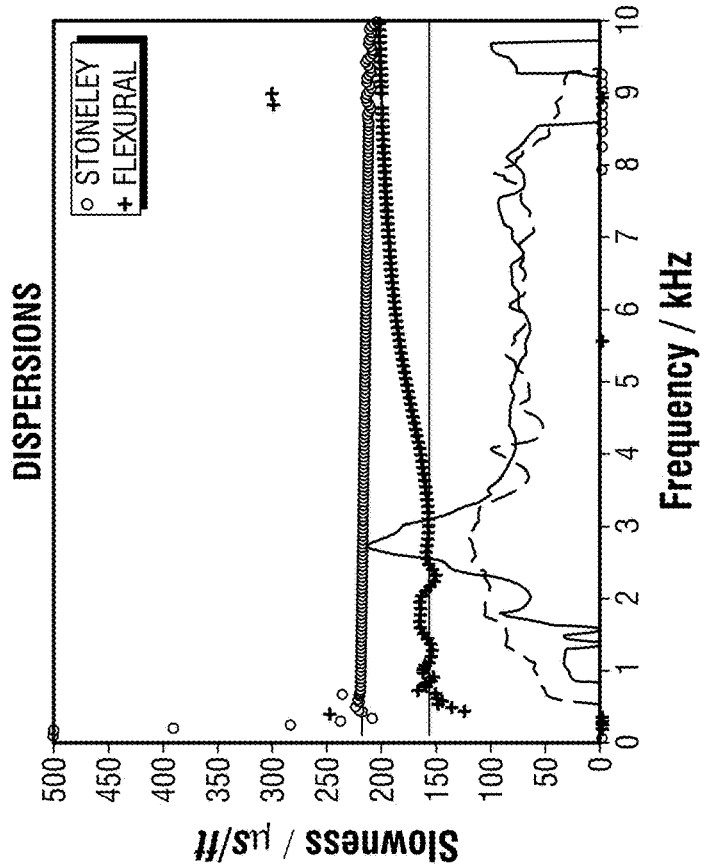
Figure 11B:
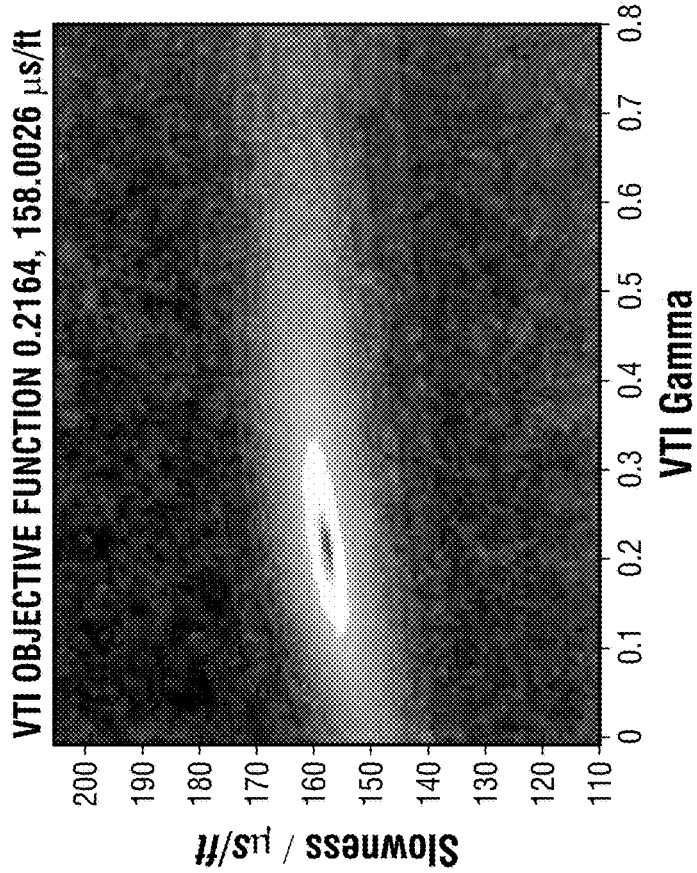
FIGS. 11A and 11B are graphs illustrating an inverted Gamma anisotropy parameter in an upper section.
Figure 11A:
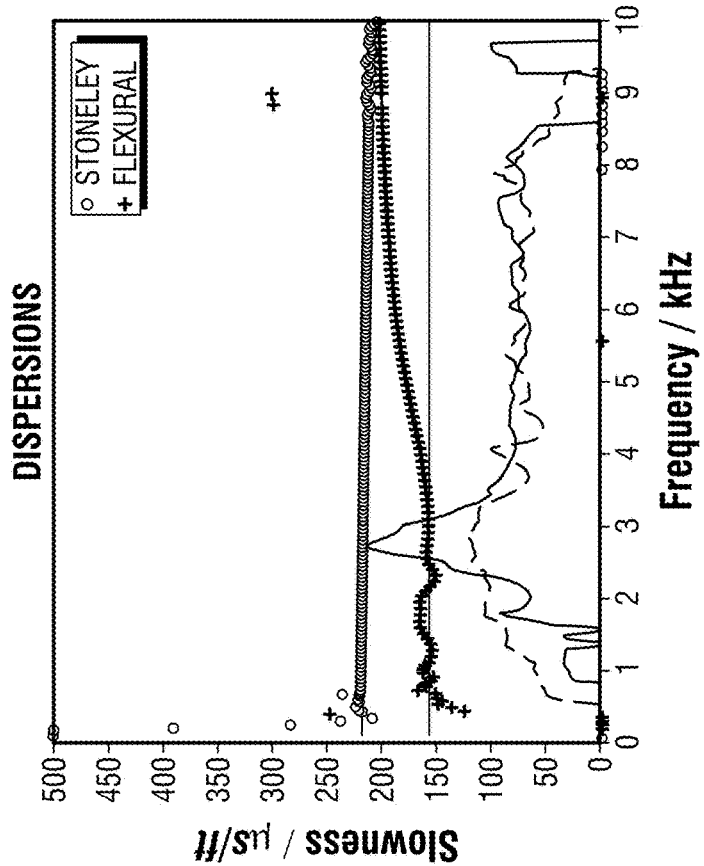

FIG. 9 is a graph showing changes in mud density versus changes in mud slowness for the same oil-based mud with increasing barite content. As graphed, the changes in mud slowness may be accompanied by corresponding changes in mud density and so the establishment of the mud density may affect the inversion process. FIGS. 10A-11B illustrate sensitivity of Thomsen Gamma inversion to accuracy of the mud density input. The figures show the inversion for Gamma anisotropy parameter in the upper section of the well for both an operator's mud density measurement (FIGS. 10A-10B), and using a conservative estimation of mud density change due to the settling of the borehole fluid (FIGS. 11A-11B). As illustrated, the wrong mud density in a Thomsen Gamma inversion may produce an error of about or more than 50%.

Figure 12:
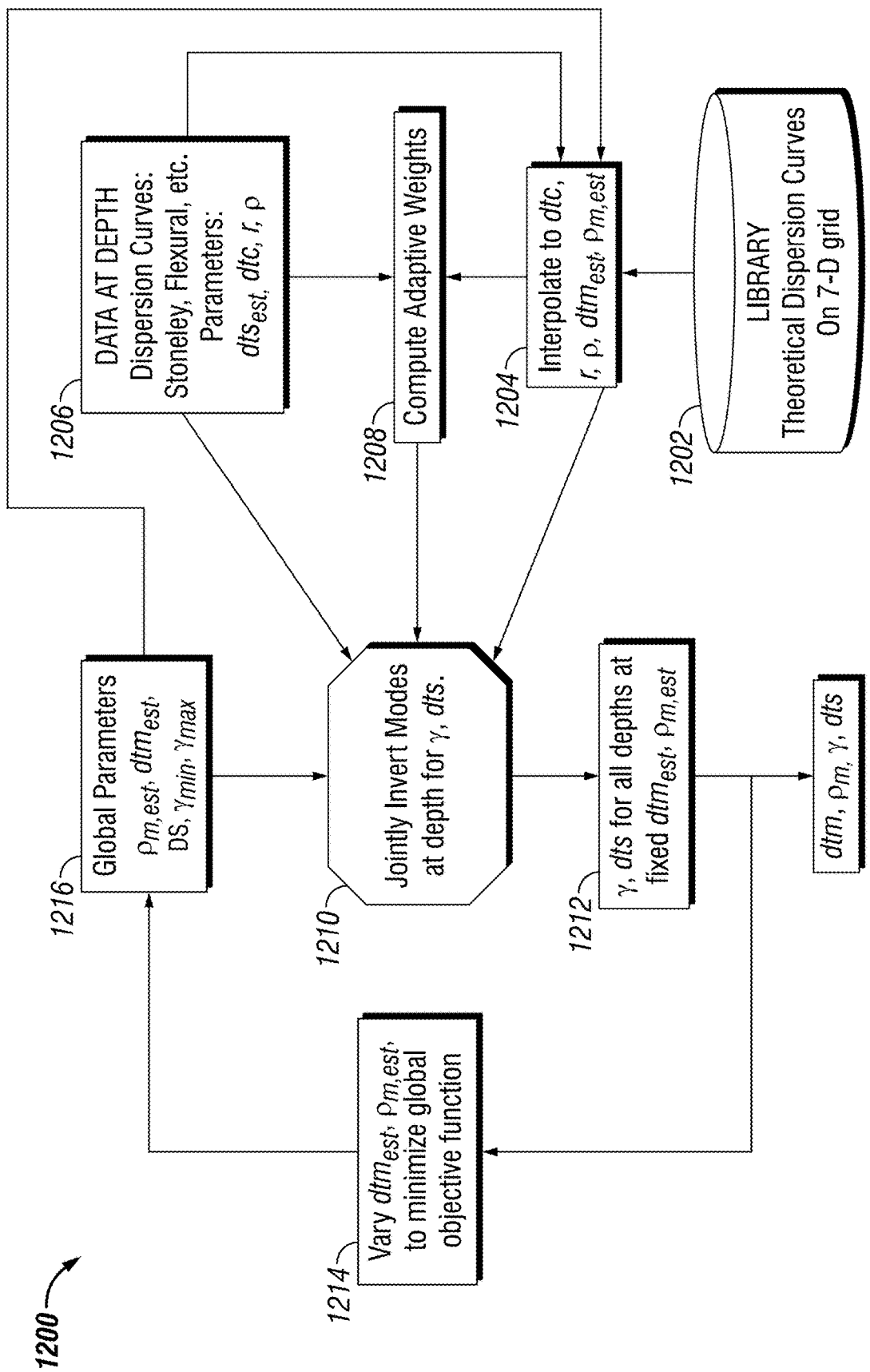
FIG. 12 is an inversion workflow for both mud slowness and mud density.

FIG. 12 illustrates workflow 1200 to reduce error by inverting over a zone for global mud density in addition to inverting for global mud slowness and variable Gamma anisotropy, ($\gamma$, $C_{44}$). In this context global means constant (depth independent) over the zone, where a zone is a set of at least one or usually more contiguous depths, as opposed to varying from depth-to-depth within the zone like the anisotropy does. This workflow assumes the availability of a pre-computed library 1202 of dispersion curves, i.e., the expected slowness of a given acoustic wave mode generated by a specific acoustic tool as a function of frequency for a given set of formation parameters. The library (theoretical dispersion curves) may be computed 'on-the-fly' if processing power is sufficient. In examples, the model formation parameters include mud slowness (dtm), compressional wave slowness (dtc), vertical shear wave slowness (dts, abbreviated in the following equations as s), shear wave anisotropy ($\gamma$), borehole radius (r), formation density ($\rho$), and mud density ($\rho_m$). The effect of the acoustic tool on the dispersion curves is usually modeled adequately by an effective tool radius determined through lab experiments or analysis of large quantities of field data. Once the constant tool radius is determined in this manner, the library is generated as a function of the formation parameters listed above. It should be obvious to those skilled in the art that some acoustic tools may require more sophisticated tool modeling to generate the library. A more realistic tool model may consist of several tool parameters that may themselves be dependent on the formation parameters. In either event, once these tool parameters have been determined through external means, the library for a specific tool may be generated and accessed through the formation parameters. With these seven formation parameters, a corresponding dispersion curve may be retrieved from a pre-computed library 1202. A direct retrieval may be possible if the parameter values correspond precisely to the values of a precomputed curve, but more often the system may employ some form of interpolation to derive the desired dispersion curve from the precomputed curves for nearby parameter values.

The workflow of FIG. 12 is as follows. First an initial estimated mud slowness and mud density is chosen for the zone (block 1216). Denote them as $dtm_{est}$ and $\rho_{m,est}$. Further, acquire the formation parameters $dts_{est}$, dtc, r, and $\rho$, from external sources, typically logs, for the depths in the zone. These parameters are depth dependent although for convenience the subscript, d, is not shown. $dts_{est}$ is an initial estimate of the shear slowness ($C_{44}=\rho/(dts_{est})^2$) used to center the allowed inversion bounds for dts, i.e. the final inverted dts value is assumed in the range [$dts_{est}$−DS, $dts_{est}$+DS].

Also compute the data dispersion curves, $Sx^d(f)$, from the acoustic waveforms for the depths in the zone. The depth dependent parameters and dispersion curves are shown in block 1206. Denote the portion of the (possibly non-uniform) library parameter grid coordinates spanning ($\gamma_{min}$, $\gamma_{max}$) and $dts_{est} \pm DS$ as $$(\gamma_n, s_m) = (\gamma_{n-1}, s_{m-1}) + (\Delta\gamma_n, \Delta s_m) \quad m=1, \ldots, M-1; n=1, \ldots, N-1 \qquad (2)$$

($\gamma_{min}$, $\gamma_{max}$) and DS are additional constant parameters noted in block 1216 defining the inversion grid in slowness and gamma. The grid resolution should be fine enough so that theoretical dispersion curves off the gamma, s grid may be accurately estimated by linear equations in gamma and s. As noted previously, the library dispersion curves are interpolated onto the gamma, s grid at the values of the other formation parameters ($dtm_{est}$, $\rho_{m,est}$, dtc, r, and $\rho$). This is shown in block 1204. The gamma, s grid defines a mesh of linear regions in any of several possible ways, but for the sake of providing a concrete example we will define a triangular mesh with vertices $$\Delta_{jnm} = \{(\gamma_{n+j}, s_{m+j}), (\gamma_{n+1}, s_m), (\gamma_n, s_{m+1})\} \quad j=0,1; n=0, \ldots, N-2; m=0, \ldots, M-2 \qquad (3)$$

The slowness of mode X within a triangle is expressible linearly as $$S_X(f,\gamma,s) = S_X(f,\gamma_{n+j}, s_{m+j}) + (\gamma - \gamma_{n+j}) a_{X,jnm} + (s - s_{m+j}) b_{X,jnm}$$
$$(\gamma, s) \in \Delta_{jnm} \qquad (4)$$

where the coefficients as a function of frequency are given by $$a_{X,jnm} = \frac{S_X(f, \gamma_{n+1}, s_{m+j}) - S_X(f, \gamma_n, s_{m+j})}{\Delta \gamma_{n+1}} \qquad (5)$$

-continued $$a_{X,jnm} = \frac{S_X(f, \gamma_{n+j}, s_{m+1}) - S_X(f, \gamma_{n+j}, s_m)}{\Delta s_{m+1}}$$

and $Sx(f, \gamma_n, s_m)$ are the theoretical library dispersion curves on the grid.

With this framework in place, we select an objective function (not the global objective function mentioned earlier) for the inversion algorithm to minimize with respect to $\gamma$ and s at each depth in the zone. The inversion corresponds to block 1210, the octagon. A suitable function is the L2 norm:

$$L2 = \Sigma_{X,f}[S_X(f,\gamma,s) - S_X^d(f)]^2 W_x(f) \qquad (6)$$

where $W_x(f)$ is a frequency dependent weighting (computed in block 1208 and described further below) and $S_x^d(f)$ is the dispersion curve computed from the waveform data for acoustic wave propagation mode X at a given depth (usually X={flexural, Stoneley}, but other modes may be used if they are sensitive to the inversion parameters). Differentiation and algebraic manipulation show that the anisotropy, $\gamma$, and shear wave slowness, s, that minimize the L2 norm are the solutions to the following:

$$A \begin{bmatrix} \gamma - \gamma_n \\ s - s_m \end{bmatrix} = \begin{bmatrix} u_\gamma \\ u_s \end{bmatrix} \qquad (7)$$

where $$A \equiv \begin{bmatrix} \sum_{X,f} W_X a_{X,jnm}^2 & \sum_{X,f} W_X a_{X,jnm} b_{X,jnm} \\ \sum_{X,f} W_X a_{X,jnm} b_{X,jnm} & \sum_{X,f} W_X b_{X,jnm}^2 \end{bmatrix} \qquad (8)$$

and $$\begin{bmatrix} u_\gamma \\ u_s \end{bmatrix} \equiv - \begin{bmatrix} \sum_{X,f} W_X a_{X,jnm}(S_X(\gamma_{n+j}, s_{m+j}) - S_X^d) \\ \sum_{X,f} W_X b_{X,jnm}(S_X(\gamma_{n+j}, s_{m+j}) - S_X^d) \end{bmatrix} \equiv \qquad (9)$$

$$- \begin{bmatrix} \sum_{X,f} W_X a_{X,jnm} c_{X,jnm} \\ \sum_{X,f} W_X b_{X,jnm} c_{X,jnm} \end{bmatrix}$$

For brevity, the frequency dependence of the variables in equations (8)-(9) has been suppressed. Note that other weighting-dependent objective functions and inversion algorithms may alternatively be used. It is not necessary that the objective functions provide an analytic solution. For example, the L1 norm could be used together with a simplex inversion algorithm.

A solution to equation (7) can be found for each mesh triangle. The solution that lies within the boundaries of the triangle giving rise to it will be the correct solution.

$$(\gamma_{jnm}, s_{jnm}) \in \Delta_{jnm} \qquad (10)$$

In examples, it may be possible, due to numerical errors, that a correct solution lying near the boundary might be calculated to be just outside the boundary, so this possibility should be accounted for. The theoretical dispersion curves generally change monotonically with respect to $(\gamma, s)$, so if the theoretical dispersion curves are a good fit to the data dispersion curves a single solution may be found via an iterative search. However, in the case of extremely noisy data or data that does not match the theoretical dispersion curves (e.g., due to borehole breakout), multiple solutions may exist. In this situation, the inversion might average the solutions and take the locus of the solutions as the uncertainty. Alternatively, the inversion might perform an exhaustive search to identify the position in the $(\gamma,s)$ parameter space of the global minimum of the objective function as the solution. In either case, the result should be flagged as suspect due to poor data quality.

Other possible reasons for the system being unable to determine a solution might include the correct solution being located outside the library grid. In this case, pre-computed library 1202 may be expanded to include the necessary region. If the chosen acoustic modes all have small or uneven sensitivities to the anisotropy and slowness parameters, the $a_{x,jnm}$ and/or $b_{x,jnm}$ coefficients near the minimum may be extremely small, making the matrix in equation (7) ill-conditioned. In this case, different or additional modes should be included in the analysis. In any event any solutions found are preferably flagged as suspect and ignored when doing the mud slowness, mud density inversion described further below.

Though the foregoing example only interpolates over Thomsen coefficient and vertical shear, the equations may be extended in a straightforward manner to invert for other parameters as well. For example if there is no formation density available at this depth one could invert for it as well. However, as the number of inverted parameters increases the problem eventually becomes ill posed (non-unique solution). Furthermore, execution time will increase.

As previously indicated, using a noisy portion of the dispersion curves to do the inversion may adversely affect the inversion process. The effect of noise may be reduced by associating a frequency-dependent weighting function with each of the acquired dispersion curves from the tool. This may be done if the set of theoretical curves used for a given depth provide an estimate of what the shape of the dispersion curves computed from the data should look like if no noise were present. Using this a priori knowledge an estimate of what portions of the dispersion curves computed from the data have substantial noise may be used to compute a weighting function to dampen those frequencies. For convenience drop the subscripts on the triangle symbol, $\Delta$. Define the function $S_{X,\Delta}^d$ as $$S_{X,\Delta}^d(f) = S_X^d(f) - \bar{S}_{X,\Delta}(f) \qquad (11)$$

where the function $S_{X,\Delta}(f)$ is the average of the theoretical dispersion curves over the vertices of the triangle. The noise in the neighborhood, Df, of a given frequency is estimated for a triangle from the normalized variance, $$\sum_{X,\Delta}^d (f) = \frac{1}{N_f} \sum_{f'=f-Df}^{f'=f+Df} \left[ \frac{S_{X\Delta}^d(f') - \bar{S}_{X\Delta}(f)}{S_{X,\Delta,MAX} - S_{X,\Delta,MIN}} \right]^2 \qquad (12)$$

where $S_{X,\Delta,MAX}$ and $S_{X,\Delta,MIN}$ are the maximum and minimum slowness values over all frequencies of $S_{X,\Delta}$, and $\bar{S}_{X,\Delta}^d$ is the mean of $S_{X,\Delta}^d$ over the frequency band. The variance computed in equation (12) can be used to compute weights.

One illustrative embodiment employs the following weighting function:

$$W_{X,\Delta}(f) = \frac{\min_f \left( \sqrt{\Sigma_{X\Delta}^d(f)} \right)}{\sqrt{\Sigma_{X\Delta}^d(f)}} \qquad (13)$$

This function gives the measured dispersion curve more weight where its shape looks like the shape of the theoretical dispersion curves. If the variance is low relative to other parts of the dispersion curve it will have a relatively high weighting. If the dispersion curve drifts or oscillates wildly at low or high frequency due to poor SNR, the weighting is less.

One possible problem occurs if the dispersion curve drifts and then flattens out at low or high frequency. Then the flat region would have a substantial weight. This effect may be reduced by limiting the frequency range. Find the frequency, $f_{max}$, corresponding to the maximum of equation (13). Recompute equation (12) using $\overline{S}_{X,\Delta}(f) = \overline{S}_{X,\Delta}(f_{max})$ and normalize it. Denote the result as $\Sigma_{X,MAX}^d(f)$. Then compute new weights, $W'_{X,\Delta}(f)$ by masking the weights of equation (13) as follows:

$$W'_{X,\Delta}(f) = \begin{cases} W_{X,\Delta}(f) & \text{for } f_1 < f < f_2 \\ 0 & \text{otherwise} \end{cases} \quad (14)$$

where $f_1$ is the highest frequency less than $f_{max}$ such that $\Sigma_{X,MAX}^d(f) > W_{X,\Delta}(f)$ and $f_2$ is the lowest frequency greater than $f_{max}$ such that $\Sigma_{X,MAX}^d(f) > W_{X,\Delta}(f)$. The low and high frequency regions where the dispersion curves drift are suppressed. Regions with small ripple have higher weights as desired.

The weighting functions of equations (13) or (14) may be applied in equations (8)-(9) for each triangle, or an average over the triangles to get a single set of weights. In examples, the weights may be zeroed out when they fall below a threshold. Another alternative is to take the n'th root of the weights after masking to flatten them. Other alternatives may be readily conceived. Specifically, the set of theoretical curves used for a given depth provide an estimate of what the shape of the dispersion curves computed from the data should look like if no noise were present. Using this a priori knowledge an estimate of what portions of the dispersion curves computed from the data have substantial noise may be used to compute a weighting function to dampen those frequencies.

Returning to FIG. 12, the inversion process for the depth interval begins in block 1206 and 1216 with the setting of the depth dependent ("at depth") and global parameters respectively. In this context, in order to avoid an ill-posed problem, the depth dependent parameters are considered "fixed" parameters with the exception of shear slowness $dts_{est}$. Fixed parameters are independently measured depth dependent parameters such as formation density, $\rho$, compressional slowness, dtc, and borehole radius, r, that are considered known and not changed during the inversion. The initial shear slowness is considered accurate enough to center the s, $\gamma$ grid, but then both s and $\gamma$ are inverted for as described previously. As a Quality Control check, the final shear wave estimate may be compared to the original shear estimate. In a perfect world they should be equal. If there is a large difference between them either the initial estimate taken from an external source is wrong, or the anisotropy inversion failed. The global parameters are independent of depth within the zone and may be inverted for, such as $dtm_{est}$, and $\rho_{m,est}$, or not changed during the inversion ($\Delta S$, $\gamma_{min}$, $\gamma_{max}$). The limits on the range of anisotropy parameter values and shear wave slowness values are set based on the user's experience and expectations. Compressional wave slowness, dtc, and the initial shear wave estimate, are typically derived from acoustic waveform measurements using standard techniques (e.g., measuring the arrival time of the compressional wave mode), while formation density, $\rho$, is usually taken from neutron density logs. Initial estimates of the drilling fluid ("mud") slowness $dtm_{est}$, and mud density, $\rho_{m,est}$, may be made in any suitable fashion including the use of default values, mud pit measurements, user input, or average values from previous acoustic logs in the region. The inversion process obtains relevant dispersion curves, such as Stoneley, Flexural, and/or the like (block 1206). In block 1208, the weight function is determined, then in block 1210 the process jointly inverts the dispersion curves at depth for shear wave slowness and anisotropy values. Block 1210 uses variables from blocks 1204, 1206, and 1208 and 1216 and equations 7-10 or their equivalent. Block 1212 holds the inverted values for shear wave slowness and anisotropy for all depths in the interval at fixed mud slowness and density. In block 1214, the mud slowness and mud density are inverted for by varying them to minimize the global objective function (not to be confused with the global minimum in a parameter space of an objective function) described next.

Referring again to FIG. 12, the operations of blocks 1204, 1206, 1208, and 1210 are repeated for each logging tool depth to obtain an anisotropy and slowness estimate for all the depths in the depth interval. In block 1214, the inversion process updates an estimated drilling fluid ("mud") slowness $dtm_{est}$, and mud density, $\rho_{m,est}$, and computes a global objective function that uses all the depths, d, in the zone, e.g., the sum of L2 norms over the zone depths evaluated at the current values of the depth dependent values ($\gamma(dtm_{est}, \rho_{m,est})$, $s(dtm_{est}, \rho_{m,est})$). Dropping the est subscript for convenience.

$$L2(dtm,\rho) = \Sigma_{X,f,d}[S_X(f,\gamma_d(dtm,\gamma),s_d(dtm,\gamma),dtm,\rho) - S_X^d(f)]^2 W_{X,d}(f,dtm,\rho) \quad (15)$$

Figure 13:
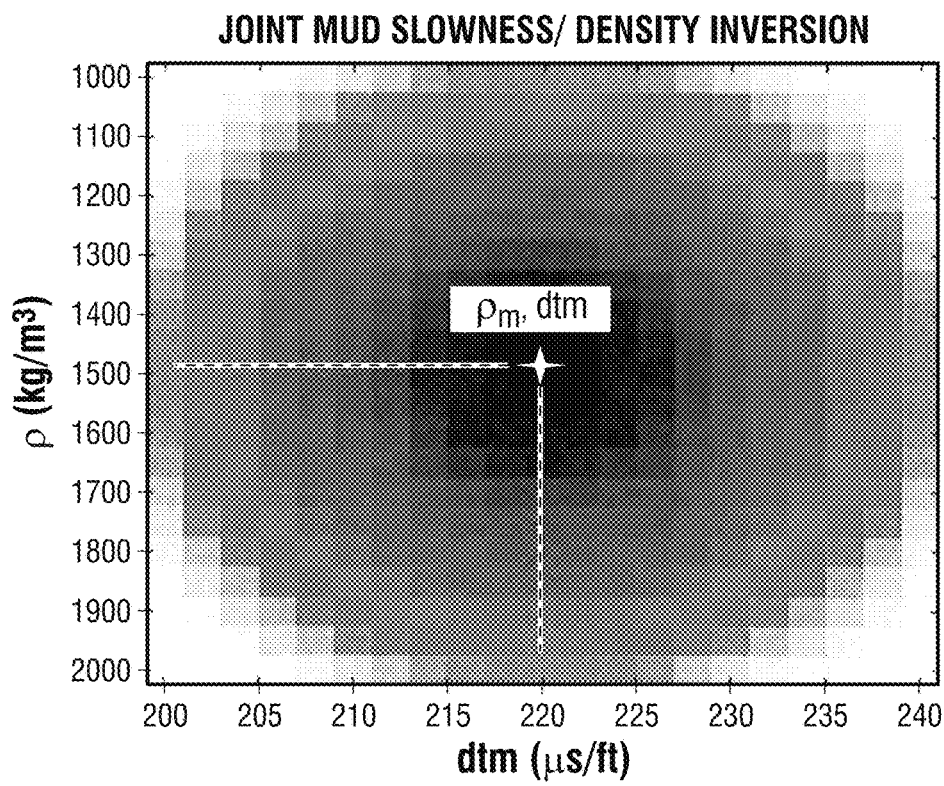
FIG. 13 is a graph of a two-dimensional objective function from inverting for the mud slowness and the mud density.

Here, the index d refers to depth, and $S_X^d(f)$ is the computed dispersion curve from waveforms at depth d. (The weights should be normalized across depths and mud slowness/density. Often the dependence of the weights on mud slowness/density can be neglected, i.e., if a suitable set of weights that dampens the correct portions of the derived dispersion curves is found for some mud slowness/density, the same weights may be applied for other mud slowness/density values since the data itself does not change.) This global (i.e. using all the depths in the interval) objective function may be minimized with respect to mud slowness and mud density using a 2-D minimization algorithm. The output is the estimated mud slowness, mud density, and depth dependent Thomsen coefficients and vertical shear slownesses for the zone as defined by the position in the parameter space of the global objective functions global minimum. It should be noted, the term 'global' is being used two ways. The 'global objective function' is the objective function of equation (15) using all depths in a depth interval. The position of the 'global minimum' in a parameter space of an objective function (whether the global objective function defined by equation (15) or the one defined for a specific depth in equation (6)) defines the estimate of the parameters. An example global objective function is shown in FIG. 13.

Figure 14:
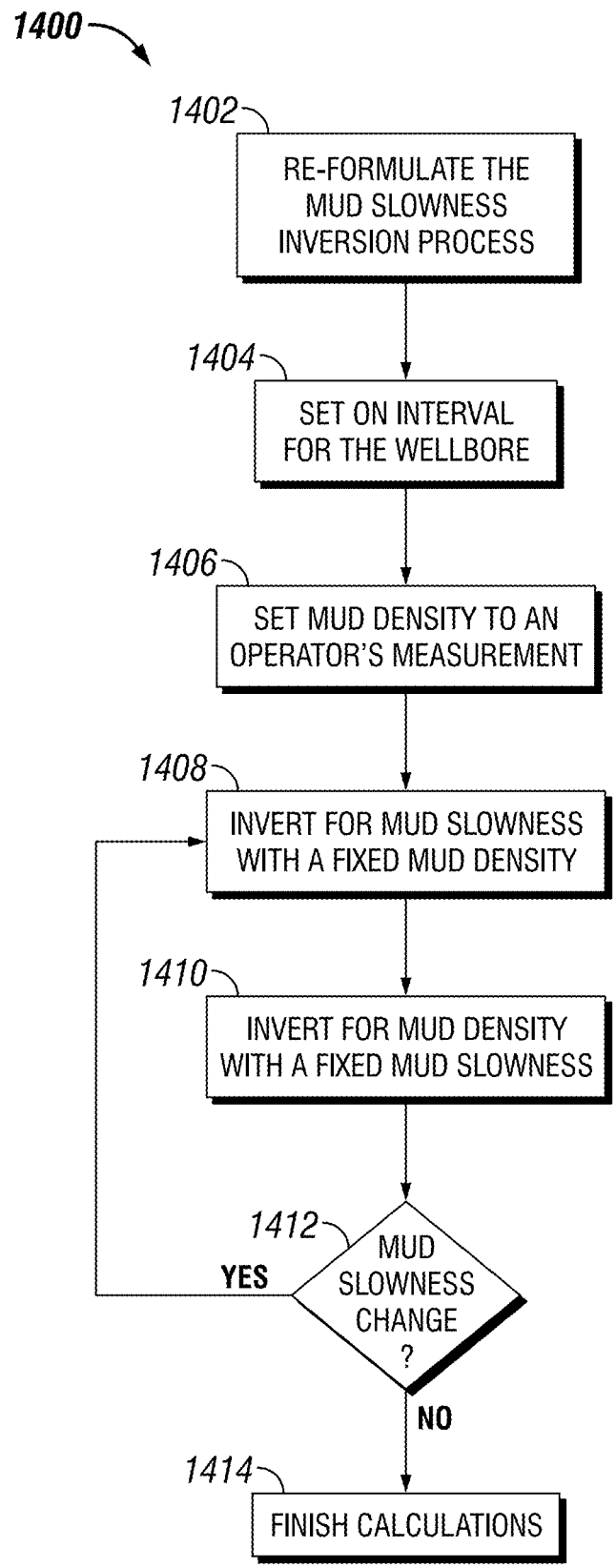
FIG. 14 is a workflow to reduce the computational burden for inverting the mud slowness and the mud density.
Figure 15:
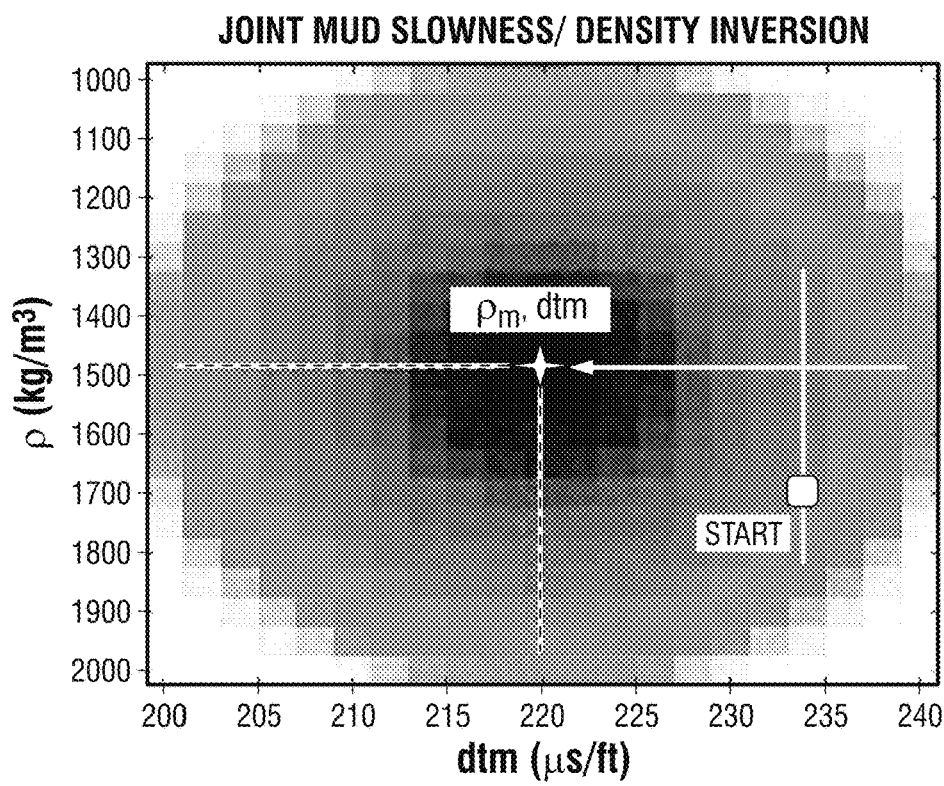
FIG. 15 is a graph from the workflow in FIG. 14.

In examples, the inversion workflow in FIG. 12 may be done by brute force (i.e. computing the objective function shown in FIG. 13, over the entire slowness-density grid), which may increase the length of time to compute the function. As illustrated in FIG. 14, in examples, a workflow 1400 may reduce the computational burden. In step 1402 an operator may set an interval for the wellbore and initialize mud slowness and mud density. The interval may be any section within the wellbore that may be measured. In step 1402 the operator may set a mud density to an operator's measurement of the mud density at a well site. In step 1404, the operator may invert for mud slowness with a fixed mud density, i.e. find the global minimum of the objective function described in equation 15 along the line of fixed mud density. Then in step 1406, the operator may invert for mud density with a fixed mud slowness starting at the minimizing point of the previous step, i.e. find the global minimum of the objective function described in equation 15 along the line of fixed mud slowness. The process 1404-1406 is repeated until the mud slowness/density at the objective function minimum along a line of constant mud slowness or density stops changing between iterations (decision block 1408). This signifies the global minimum of the objective function has been reached and found the best estimate of mud density and mud slowness for the depth interval. FIG. 15 illustrates a two-step convergence result from workflow 1400. This entire process is repeated for each depth interval (block 1410). Once the inverted mud slowness and mud density are determined for all zones, the mud slowness and mud density from all zones are fitted to smoothly varying continuous curves as a function of depth (block 1412), and a final depth-to-depth dts, Thomsen Gamma inversion may be performed over the entire wellbore (block 1414). Alternatively, the order of blocks 1404 and 1406 may be switched in the workflow.

Figure 16:
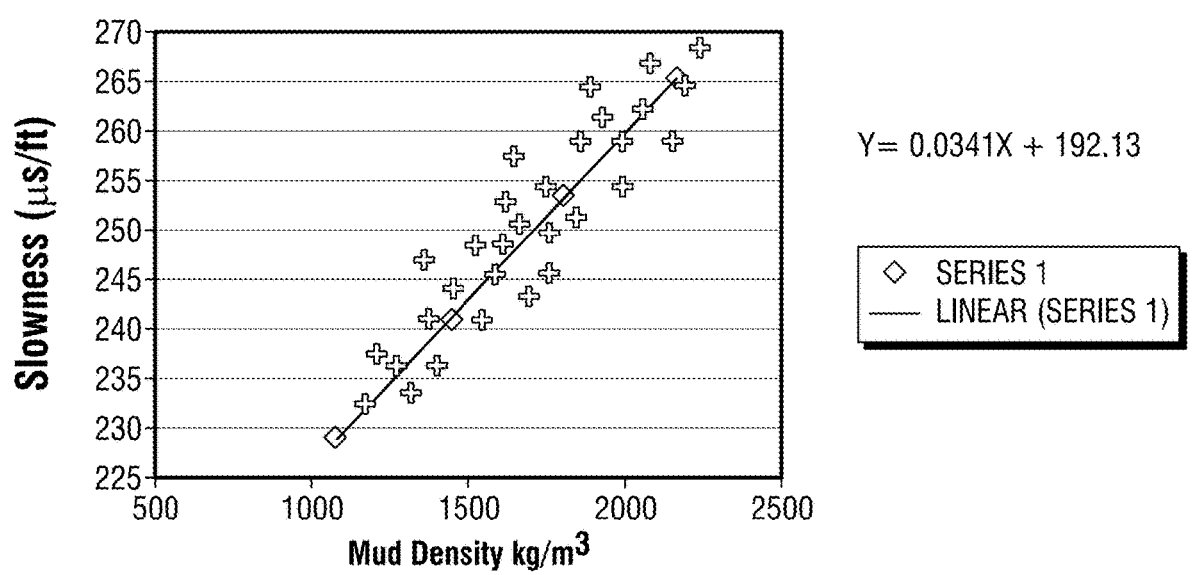
FIG. 16 is a graph of a regression analysis relationship between the mud slowness and the mud density.

An alternative method to fitting the mud slowness and mud density curves as a function of depth may include performing a linear regression analysis on the inverted mud slowness and mud density results for all the zones to determine a low order relationship between mud slowness and density as illustrated in FIG. 16, which shows a linear relationship. FIG. 16 illustrates a linear regression analysis, where the final inversion over the well uses the mud curve and the regression relationship instead of the fitted mud and density curves. Alternatively, the final inversion uses the density curve and the regression relationship. As discussed above, the workflows invert for the density and mud slowness. However, if the relationship between mud slowness and density may be established through other means (e.g. lab data), this relationship may be used to determine the correct trial mud density, trial mud slowness pair and invert only for mud slowness (or only for mud density).

Improvements from the workflows listed above may allow an operator direct determination of borehole fluid density and mud slowness as a function of depth using multi-mode analysis of full waveform sonic data. This improves inversion for horizontally-polarized, vertically propagating shear slowness, dts, and Thomsen gamma anisotropy, $\gamma$, using full-waveform sonic data. Knowledge of mud density and mud slowness as a function of depth will also improve any other algorithm that uses these parameters.

Acoustic logging measurements may be valuable for determining the velocity structure of subsurface formations, which information may be useful for migrating seismic survey data to obtain accurate images of the subsurface formation structure. Subsurface formations may often be anisotropic, meaning that the acoustic wave's propagation speed depends on the direction in which the wave propagates. Most often the formations, even when anisotropic, may be isotropic in the horizontal plane. This version of anisotropy is defined as vertical transverse isotropy (VTI). Accurate imaging may account for such anisotropy during the migration process. Such imaging enables reservoirs to be delineated from surrounding formations, and further indicates the presence of formation boundaries, laminations, and fractures, which information is desired by an operator as they formulate a production strategy that maximizes the reservoir's economic value.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1: An acoustic logging method that may comprise acquiring waveforms for multiple acoustic wave modes as a function of tool position in a borehole; deriving position-dependent mode dispersion curves from the waveforms; accessing a computed library of dispersion curves for a vertical shear slowness (s) and a Thomsen gamma ($\gamma$) of a given acoustic wave mode as a function of frequency; interpolating dispersion curves in the computed library to an assumed known compressional wave slowness, a borehole radius, a formation density, a mud density, and a mud slowness; computing an adaptive weight; and inverting dispersion curve modes jointly for a shear wave anisotropy, a vertical shear wave slowness, an inverted mud slowness, and an inverted mud density as a function of depth.

Statement 2: The method of statement 1, wherein inverting joint modes further comprises: initializing the mud slowness and the mud density for a plurality of depths; minimizing an objective function to estimate $\gamma$ and s in at least one of the plurality of depths; computing a global objective function in the at least one of the plurality of depths; and varying the mud slowness and the mud density and repeating the prior two steps until the global objective function is minimized to obtain an estimated mud slowness and estimated mud density for the at least one of the plurality of depths.

Statement 3: The method of statement 2, repeating each step of claim 2 for all depth intervals to generate the mud slowness and the mud density for each depth interval in the borehole.

Statement 4: The method of statements 1 or 2, wherein inverting joint modes further comprises: creating a mud slowness curve and a mud density curve in view of depth for a well by fitting the mud slowness curve and the mud density curve to the inverted mud slowness and the inverted mud density.

Statement 5: The method of statements 1, 2, or 4, wherein inverting joint modes further comprises: creating a mud slowness curve and a mud density curve in view of depth for a well by fitting the mud slowness curve and performing a regression analysis to create a relationship between the mud slowness and the mud density using the inverted mud slowness and the inverted mud density.

Statement 6: The method of statements 1, 2, 4, or 5, wherein inverting joint modes further comprises: creating a mud slowness curve and a mud density curve in view of depth for a well by fitting a mud density curve and performing a regression analysis to create a relationship between the mud slowness and the mud density using the inverted mud slowness and the inverted mud density.

Statement 7: The method of statements 1, 2, or 4-6, wherein inverting joint modes further comprises using the mud slowness and the mud density curves to invert at a plurality of depths in a well for a final Thomsen gamma and the vertical shear slowness by minimizing a single depth objective function at each depth in the borehole.

Statement 8: The method of statements 1, 2, or 4-7, further comprising producing a graph including the mud slowness against a depth of the borehole.

Statement 9: The method of statements 1, 2, or 4-8, further comprising producing a graph including the mud density against a depth of the borehole.

Statement 10: The method of statements 1, 2, or 4-9, wherein the computed library includes formation parameters of the mud slowness, the compressional wave slowness, the vertical shear wave slowness, the shear wave anisotropy, the borehole radius, the formation density, and the mud density.

Statement 11. An acoustic logging system that may comprise a logging tool configured to be disposed in a borehole; a conveyance attached to the logging tool, wherein the conveyance is configured to raise or lower the logging tool in the borehole; at least one sensor, wherein the at least one sensor is disposed on the logging tool and configured to acquire waveforms; and at least one processor configured to: derive position-dependent mode dispersion curves from the waveforms; access a computed library of dispersion curves for a vertical shear slowness (s) and a Thomsen gamma ($\gamma$) of a given acoustic wave mode as a function of frequency; interpolate dispersion curves in the computed library to an assumed known compressional wave slowness, a borehole radius, a formation density, a mud density, and a mud slowness; compute an adaptive weight; and invert dispersion curve modes jointly for a shear wave anisotropy, a vertical shear wave slowness, an inverted mud slowness, and an inverted mud density as a function of depth.

Statement 12. The system of statement 11, wherein the at least one process is further configured to: initialize the mud slowness and the mud density for a plurality of depths; minimize an objective function to estimate $\gamma$ and s in at least one of the plurality of depths; compute a global objective function s in the least one of the plurality of depths; and vary the mud slowness and mud density and repeating the prior two steps until the global objective function is minimized to obtain an estimated mud slowness and estimated mud density for the least one of the plurality of depths.

Statement 13. The system of statement 12, wherein the at least one process is further configured to: repeat the steps of statement 12 for all depth intervals to generate the mud slowness and the mud density for each depth interval in the borehole.

Statement 14. The system of statements 11 or 12, wherein the at least one process is further configured to: create a mud slowness curve and a mud density curve in view of depth for a well by fitting the mud slowness curve and the mud density curve to the inverted mud slowness and the inverted mud density.

Statement 15. The system of statements 11, 12 or 14, wherein the at least one process is further configured to: create a mud slowness curve and a mud density curve in view of depth for a well by fitting the mud slowness curve and performing a regression analysis to create a relationship between the mud slowness and the mud density using the inverted mud slowness and the inverted mud density.

Statement 16. The system of statements 11, 12, 14, or 15, wherein the at least one process is further configured to: create a mud slowness curve and a mud density curve in view of depth for a well by fitting a mud density curve and performing a regression analysis to create a relationship between the mud slowness and the mud density using the inverted mud slowness and the inverted mud density.

Statement 17. The system of statements 11, 12, or 14-16, wherein the at least one process is further configured to: use the mud slowness and the mud density curves to invert at a plurality of depths in a well for a final Thomsen gamma and the vertical shear slowness by minimizing a single depth objective function at each depth in the well.

Statement 18. The system of statements 11, 12, or 14-17, wherein the at least one process is further configured to: produce a graph including the mud slowness against a depth of a borehole.

Statement 19. The system of statements 11, 12, or 14-18, wherein the at least one process is further configured to: produce a graph including the mud density against a depth of a borehole.

Statement 20. The system of statements 11, 12, or 14-19, wherein the computed library includes formation parameters of the mud slowness, the compressional wave slowness, the vertical shear wave slowness, the shear wave anisotropy, a borehole radius, a formation density, and the mud density.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patent. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. An acoustic logging method that comprises:
   acquiring waveforms for multiple acoustic wave modes as a function of tool position in a borehole;
   deriving position-dependent mode for dispersion curves from the waveforms;
   accessing a computed library of the dispersion curves for a vertical shear slowness (s) and a Thomsen gamma ($\gamma$) of a given acoustic wave mode as a function of frequency;
   interpolating the dispersion curves in the computed library to an assumed known compressional wave slowness, a borehole radius, a formation density, a mud density, and a mud slowness;
   computing an adaptive weight; and
   inverting dispersion curve modes jointly for a shear wave anisotropy, a vertical shear wave slowness, an inverted mud slowness, and an inverted mud density as a function of a depth of the borehole.

2. The method of claim 1, wherein said inverting dispersion curve modes jointly further comprises steps:

initializing the mud slowness and the mud density for a plurality of depths;

minimizing an objective function to estimate the γ and the s in at least one of the plurality of depths;

computing a global objective function in the at least one of the plurality of depths; and varying the mud slowness and the mud density and repeating said initializing the mud slowness and the mud density and said minimizing the objective function until the global objective function is minimized to obtain an estimated mud slowness and estimated mud density for the at least one of the plurality of depths.

3. The method of claim 2, repeating the steps of claim 2 for all depth intervals to generate the mud slowness and the mud density for each depth interval of said all depth intervals in the borehole.

4. The method of claim 1, wherein said inverting dispersion curve modes jointly further comprises:

creating a mud slowness curve and a mud density curve in view of the depth for the borehole by fitting the mud slowness curve and the mud density curve to the inverted mud slowness and the inverted mud density.

5. The method of claim 1, wherein said inverting dispersion curve modes jointly further comprises:

creating a mud slowness curve and a mud density curve in view of the depth for the borehole by fitting the mud slowness curve and performing a regression analysis to create a relationship between the mud slowness and the mud density using the inverted mud slowness and the inverted mud density.

6. The method of claim 1, wherein said inverting dispersion curve modes jointly further comprises:

creating a mud slowness curve and a mud density curve in view of the depth for the borehole by fitting the mud density curve and performing a regression analysis to create a relationship between the mud slowness and the mud density using the inverted mud slowness and the inverted mud density.

7. The method of claim 1, wherein said inverting dispersion curve modes jointly further comprises using the mud slowness and the mud density to invert at a plurality of depths in the borehole for a final Thomsen gamma and the vertical shear slowness by minimizing a single depth objective function at each depth of the plurality of depths in the borehole.

8. The method of claim 1, further comprising producing a graph including the mud slowness against the depth of the borehole.

9. The method of claim 1, further comprising producing a graph including the mud density against the depth of the borehole.

10. The method of claim 1, wherein the computed library includes formation parameters of the mud slowness, the compressional wave slowness, the vertical shear wave slowness, the shear wave anisotropy, the borehole radius, the formation density, and the mud density.

11. The method of claim 1, further comprising:

triggering a monopole acoustic source, which is configured to produce an acoustic pressure wave; and recording one or more pressure variations from the acoustic pressure wave with a receiver array.

12. An acoustic logging system that comprises:

a logging tool configured to be disposed in a borehole;

a conveyance attached to the logging tool, wherein the conveyance is configured to raise or lower the logging tool in the borehole;

at least one sensor, wherein the at least one sensor is disposed on the logging tool and configured to acquire waveforms; and at least one processor configured to:

derive position-dependent mode for dispersion curves from the waveforms;

access a computed library of the dispersion curves for a vertical shear slowness (s) and a Thomsen gamma (γ) of a given acoustic wave mode as a function of frequency;

interpolate the dispersion curves in the computed library to an assumed known compressional wave slowness, a borehole radius, a formation density, a mud density, and a mud slowness;

compute an adaptive weight; and invert dispersion curve modes jointly for a shear wave anisotropy, a vertical shear wave slowness, an inverted mud slowness, and an inverted mud density as a function of a depth of the borehole.

13. The system of claim 12, wherein the at least one process is further configured to steps:

initialize the mud slowness and the mud density for a plurality of depths;

minimize an objective function to estimate the γ and the s in at least one of the plurality of depths;

compute a global objective function s in the least one of the plurality of depths; and vary the mud slowness and mud density and repeating said initialize the mud slowness and the mud density and said minimize the objective function until the global objective function is minimized to obtain an estimated mud slowness and estimated mud density for the least one of the plurality of depths.

14. The system of claim 12, wherein the at least one process is further configured to:

repeat the steps of claim 13 for all depth intervals to generate the mud slowness and the mud density for each depth interval of said all depth intervals in the borehole.

15. The system of claim 12, wherein the at least one process is further configured to:

create a mud slowness curve and a mud density curve in view of the depth for the borehole by fitting the mud slowness curve and the mud density curve to the inverted mud slowness and the inverted mud density.

16. The system of claim 12, wherein the at least one process is further configured to:

create a mud slowness curve and a mud density curve in view of the depth for the borehole by fitting the mud slowness curve and performing a regression analysis to create a relationship between the mud slowness and the mud density using the inverted mud slowness and the inverted mud density.

17. The system of claim 12, wherein the at least one process is further configured to:

create a mud slowness curve and a mud density curve in view of the depth for the borehole by fitting the mud density curve and performing a regression analysis to create a relationship between the mud slowness and the mud density using the inverted mud slowness and the inverted mud density.

18. The system of claim 12, wherein the at least one process is further configured to:

use the mud slowness and the mud density to invert at a plurality of depths in the borehole for a final Thomsen gamma and the vertical shear slowness by minimizing a single depth objective function at each depth of the plurality of depths in the borehole.

19. The system of claim 12, wherein the at least one process is further configured to:
produce a graph including the mud slowness against the depth of the borehole or the mud density against the depth of the borehole.

20. The system of claim 12, wherein the computed library includes formation parameters of the mud slowness, the compressional wave slowness, the vertical shear wave slowness, the shear wave anisotropy, the borehole radius, the formation density, and the mud density.

\* \* \* \* \*